(12) United States Patent
Brundage et al.

(10) Patent No.: US 7,182,924 B2
(45) Date of Patent: Feb. 27, 2007

(54) SUBSTRATE PACKING FOR MONOLITH REACTORS

(75) Inventors: Kevin R. Brundage, Corning, NY (US); Gilbert De Angelis, Lindley, NY (US); G. James Piazza, Elmira, NY (US); Jimmie L. Williams, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 1002 days.

(21) Appl. No.: 09/804,944

(22) Filed: Mar. 13, 2001

(65) Prior Publication Data

US 2002/0131920 A1    Sep. 19, 2002

(51) Int. Cl.
*C01B 17/80*    (2006.01)
(52) U.S. Cl. .................. 422/211; 422/222; 422/221; 422/193
(58) Field of Classification Search ............... 422/222, 422/221, 171, 177, 179, 180, 190, 191, 193, 422/211
See application file for complete search history.

(56) References Cited

U.S. PATENT DOCUMENTS

| | | | | |
|---|---|---|---|---|
| 4,121,909 A | * | 10/1978 | Cronauer et al. | ........... 422/222 |
| 4,135,018 A | * | 1/1979 | Bonin et al. | ................ 428/116 |
| 4,195,064 A | | 3/1980 | Betteken et al. | |
| 4,323,614 A | * | 4/1982 | Gulati | ........................ 428/116 |
| 4,328,130 A | * | 5/1982 | Kyan | ........................ 502/100 |
| 4,407,785 A | * | 10/1983 | Pfefferle | ..................... 423/659 |
| 4,743,578 A | | 5/1988 | Davidson | |
| 4,767,309 A | * | 8/1988 | Mizuno et al. | ............. 425/461 |
| 4,775,518 A | | 10/1988 | Abthoff et al. | |
| 4,814,146 A | * | 3/1989 | Brand et al. | ................ 422/179 |
| 5,108,716 A | | 4/1992 | Nishizawa | |
| 5,527,631 A | | 6/1996 | Singh et al. | |
| 6,019,951 A | | 2/2000 | Sie et al. | |
| 6,029,442 A | | 2/2000 | Caren et al. | |
| 6,217,832 B1 | * | 4/2001 | Betta et al. | ................ 422/179 |

FOREIGN PATENT DOCUMENTS

| | | |
|---|---|---|
| EP | 0 226 306 | 5/1991 |
| WO | 96/33017 | 10/1996 |

* cited by examiner

*Primary Examiner*—Len Tran
(74) *Attorney, Agent, or Firm*—Kees van der Sterre

(57) ABSTRACT

An improved method and apparatus is set forth for packaging substrates in a monolith reactor, wherein the substrates are positioned in a stacked relationship along a longitudinal axis of the reactor housing. The stack of substrates is supported in a fixed position at the bottom of the stack, and the upper end of the stack is provided with a predetermined constant compression to not only compensate for different expansions between the stacked substrates and the reactor housing, but also to hold the stacked assemblies together in a tight relationship so as to prevent deleterious vibration of the substrates. The compression is preferably applied by spring-loaded means, which may be adjusted by threading a nut against the loading spring.

10 Claims, 8 Drawing Sheets

SUBSTRATE PACKING FOR MONOLITH REACTORS

FIELD OF THE INVENTION

This invention relates to improvements in monolith reactors widely used in the chemical and refining industries, and more particularly to methods and structures for packaging, sealing and assembling large diameter substrates for monolith reactors.

BACKGROUND OF THE INVENTION

Interest in the use of extruded ceramic monoliths as catalyst supports is growing in the chemical process and refining industries, since such monoliths provide both large geometric surface area and low pressure drop. The characteristics of honeycomb structures are beneficial for reactions currently obtained in trickle bed and slurry reactors. Also, monolith reactors can be used in either counter-flow or co-current flow in the so-called Taylor or slug flow regimes.

The extruded honeycomb monoliths can be catalytically active or coated with a wash coating and catalyzed with an active material. However, because present extrusion manufacturing limitations prevent the production of large monoliths, it is necessary to assemble a plurality of smaller monoliths such as by cementing the parts together in order to fabricate large monolithic structural shapes.

A major problem encountered with the use of such monolithic honeycomb structures as catalyst supports in reactors is that of vibration and differential expansion between the monoliths and the reactor walls. The honeycomb ceramic substrates, being brittle, are subject to damage and deterioration from both expansion and vibration, and the present invention provides unique support structures to compensate for and alleviate such problems.

The prior art has not really addressed these problems, although U.S. Pat. No. 5,108,716 discloses a catalytic converter for an automobile having a first and second monolith in a row. U.S. Pat. No. 4,195,064 discloses a bed-type catalytic reactor having horizontal beams mounted for movement relative to vertical columns. Finally, European Patent Specification 0226306B1 discloses a complex arrangement of ledges and projections that function to support and interlock adjacent ceramic structures used as catalyst supports.

SUMMARY OF THE INVENTION

In view of the foregoing, it is an object of the present invention to provide method and apparatus for supporting monolithic substrates within a reactor body in such a manner so as to compensate both for vibration within the reactor and for differential expansion between the substrates and the reactor body. In particular, it is an object of the invention to provide spring loading means on catalytic monoliths within a reactor so as to keep the monoliths under virtually constant compression, and thereby prevent deleterious vibration, pressure and temperature effects on the monoliths.

The invention describes various designs for assembling, supporting and packing monoliths within a reactor. A plurality of commercially available ceramic honeycomb monolithic substrates is cemented together about their outer edges, with the longitudinal axes of the adjacent honeycomb channels being parallel. If necessary, subassemblies of such cemented substrates may be further cemented together to form larger monolith assemblies. The assemblies of monoliths are then stacked within a reactor housing and supported with necessary sealing under compression to avoid the deleterious effects of vibration and expansion. A grid-work having a pattern similar to that of the juncture of the cemented outer edges of the monoliths may be positioned at each end of the stack of assemblies, and spring-loaded means is urged against at least one such grid-work to provide a substantially constant pressure on the stack of monoliths. The monoliths may be composed of metals, or of composite materials comprising mixtures of metals and ceramics, as well as ceramic materials such as zeolite, cordierite, alumina, mullite, silica or the like. Monoliths comprising carbon, or coatings or dispersions of carbon, may also be useful.

DESCRIPTION OF THE PREFERRED EMBODIMENTS

Referring now to FIGS. 1, 2A, 3 and 4, a reactor housing or tank 10 is shown having a plurality of ceramic honeycomb monoliths or substrates 12 positioned therein with the longitudinal axes of the honeycomb channels extending along parallel to the longitudinal axis a of the reactor 10. The monoliths 12 may be extruded in any desired shape, but for the embodiment shown, they are preferably extruded in a square shape, and four such squares are cemented together along their side edges to form a subassembly 14. Four of the subassemblies are then cemented together along edge portions to form the final assembly 16. The cements may be either inorganic or organic in composition, and can be cold set at room temperature or heat-treated. Particularly useful are commercial cements filled with ceramic powders. Examples of suitable commercial cements include Resbond 794 or 989 by the Cotronics Corporation and Aremco 643 or 813A by Aremco Products Company. The outer monoliths 18 are cut or machined into a rounded curvature to fit within the round reactor 10. Suitable cement, such as epoxy or phenol resins mixed with any ceramic filler and a mineral binder, is then applied to the outer cut surface of the monolith assembly 16 to form a skin and provide strength and protection to the assembly.

Figure 1:
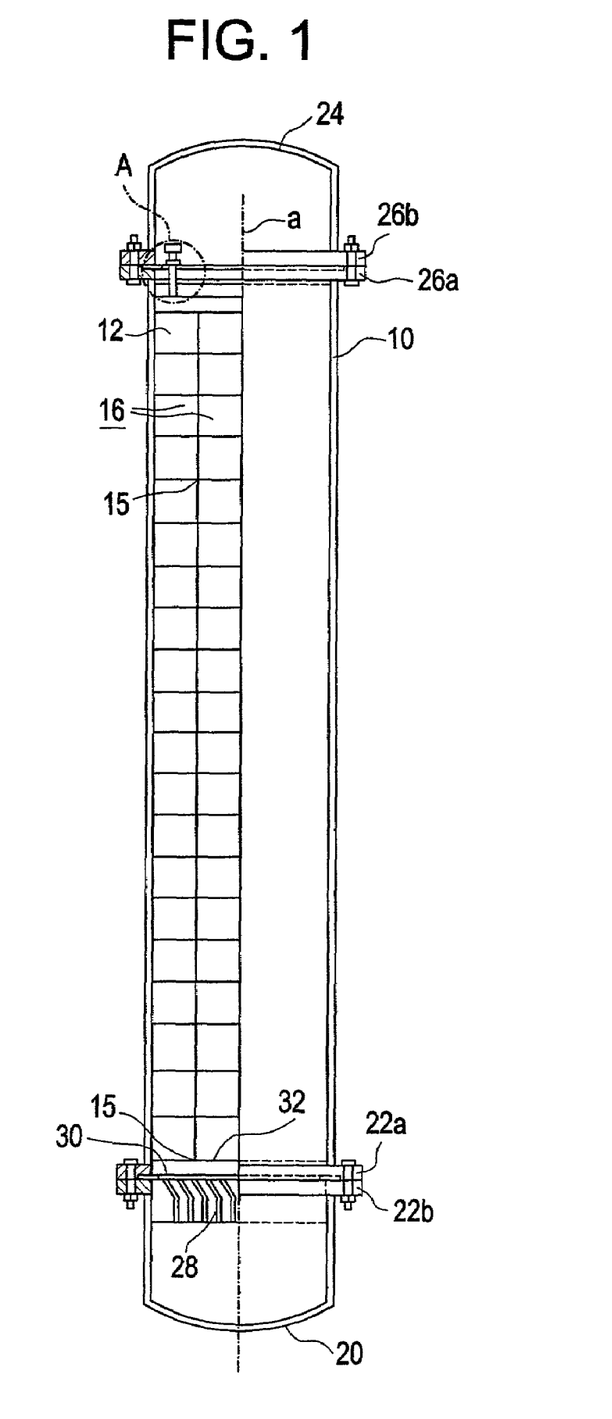
FIG. 1 is schematic view in elevation, partially in section, of a reactor tank showing one embodiment for supporting a stack of monolith assemblies under compression within the tank.

The reactor housing 10 includes a bottom cap 20 secured to the main housing by bolted together flanges 22a and 22b and an upper cap 24 secured to the main housing by bolted together flanges 26a and 26b. The caps 20 and 24 are provided with suitable inlet and outlet connections, not shown, for the flow of reactants through the reactor. A static mixer 28 is shown positioned in the lower cap 20 to mix incoming flows before entering the stack of honeycomb monolithic assemblies 16 within the reactor housing 10. A lower suspension ring 30 is held in a clamped relationship between bolted flanges 22a and 22b. The suspension ring 30 retains a support grating 32, which has a grid-work pattern similar to the cemented junctures 15 of the monoliths 12. A plurality of the final assemblies 16 is stacked on the support grating 32 within the reactor housing 10. However a gasket, not shown, of suitable material such as stainless steel, Teflon, graphite or Gortex, is positioned between the support grating 32 and the bottom assembly 16 for sealing the junctions 15 of the bottom monolith assembly and with a peripheral portion for providing sealing between the inner surface of the reactor housing 10 and the outer surface of the bottom monolith assembly 16. Each layer of monolith assemblies 16 may be rotated up to 90 degrees or more about its longitudinal axis with respect to an adjacent assembly, or the honeycomb channel openings of adjacent monoliths may be offset from one another, so as to provide a zigzag flow path through the reactor if desired. The rotation provides a self-seal between adjacent surfaces of the stacked monolith assemblies. However, additional sealing material is provided between the monolith assemblies and the inner wall of the reactor so as to squeeze the monoliths closer together and prevent by-pass.

Figure 2A:
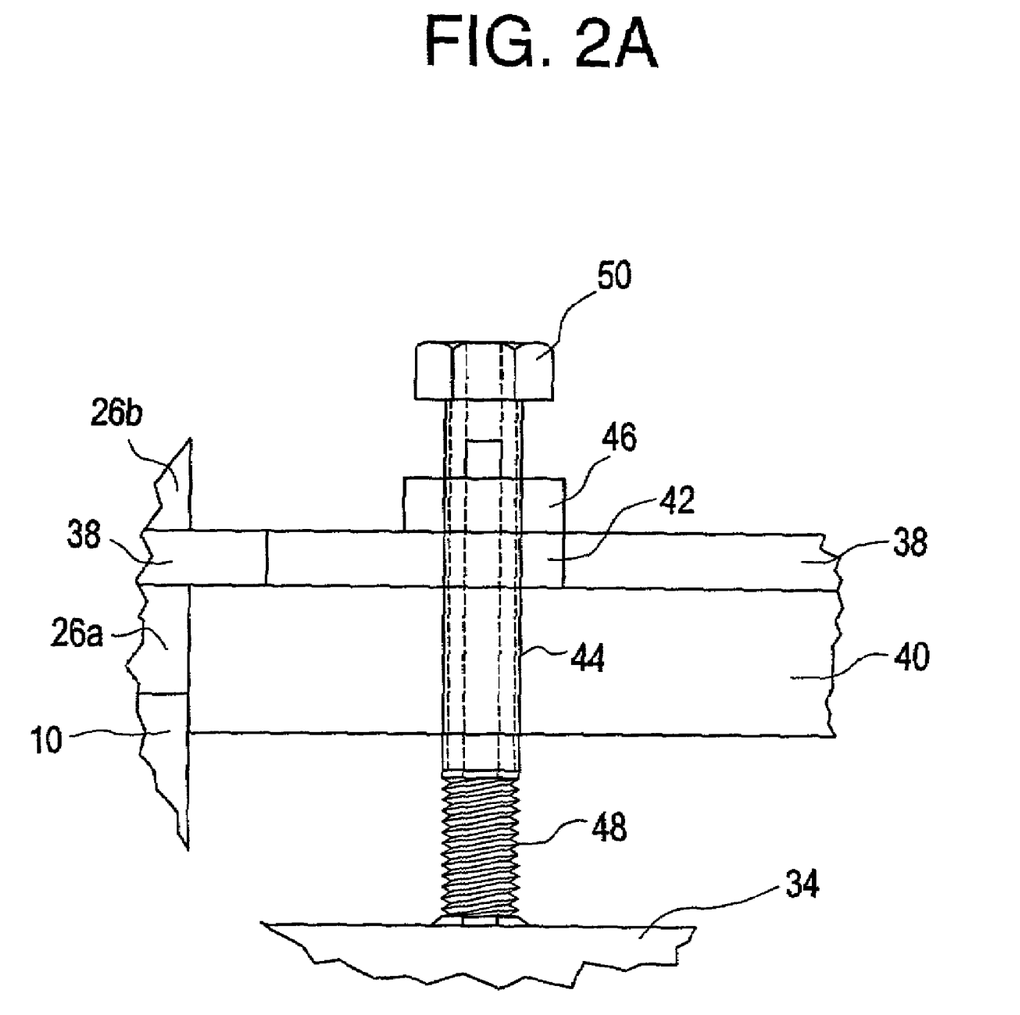
FIG. 2A is an enlarged view of the circled area "A" of FIG. 1, showing a means for providing a compressive force to the stacked monolithic assemblies.
Figure 3:
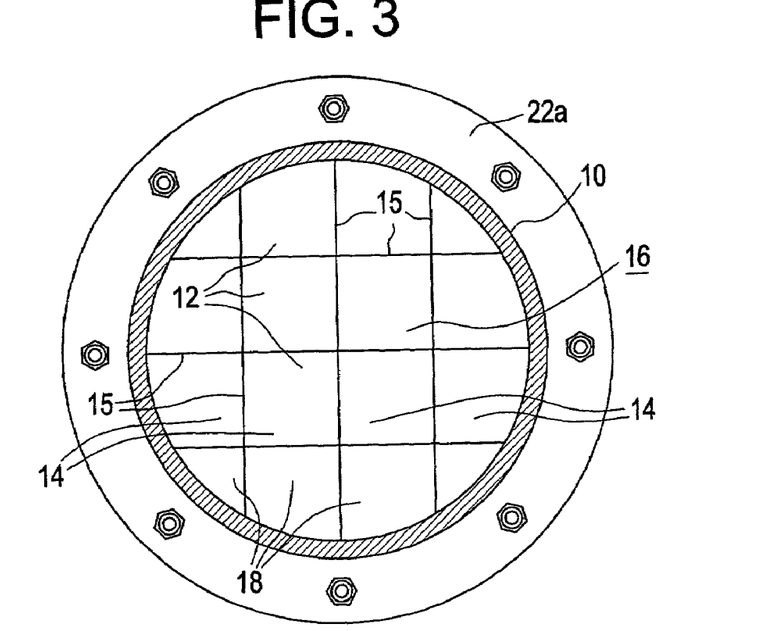
FIG. 3 is an enlarged plan view of the substrate layout within the reactor of FIG. 1.
Figure 4:
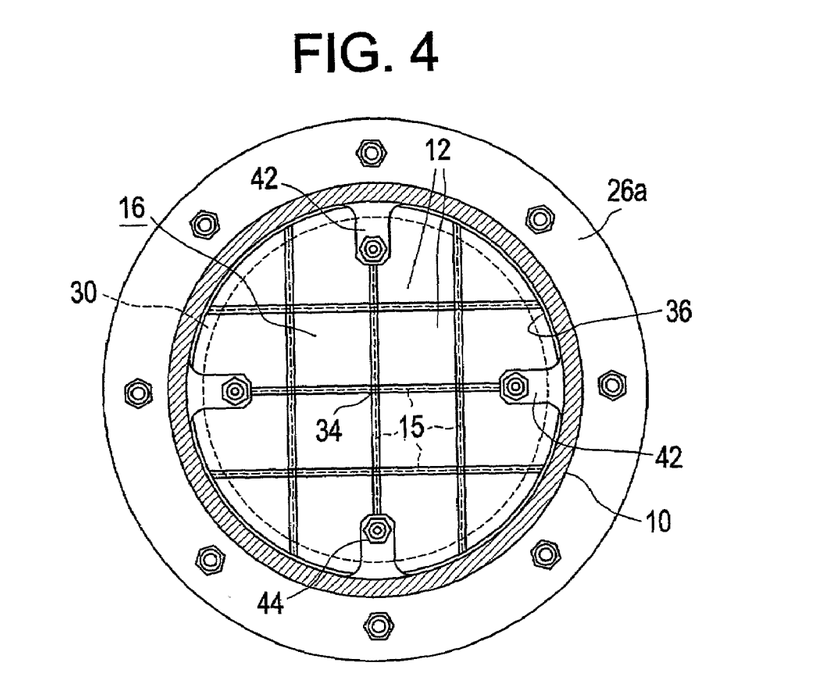
FIG. 4 is an enlarged plan view showing the support grid-work and pressure grid-work layout utilized at end portions of the stacked assembly of FIG. 1

A sealing gasket, not shown, having a pattern similar to the junctures 15 of the individual cemented monoliths, is positioned on top of the upper monolith assembly 16 for sealing such junctures. A top grating or pressure grid 34, having a circular rim portion 36 adjacent the inner wall of the reactor 10, and a grid-work similar to junctures 15 between the cemented monoliths, is positioned over the sealing gasket. An upper suspension ring 38, having a downward circular portion 40 adjacent an inner wall portion of reactor 10, has a flange portion retained between flanges 26a and 26b. The upper suspension ring 38 has a plurality of radially-inwardly projecting bosses 42. Each boss 42 has a Belville spring washer 44 secured thereto by means of a nut member 46 affixed to the suspension ring 38. A lower spring-loaded portion 48 of the washer 44 engages cross members of the pressure grid 34, and applies a desired pressure thereto by means of adjustment nut 50. Although the spring-loaded washer contact with the grid 34 is shown along individual cross members, preferably such contact is at junctures of the cross members. The spring-loaded washers 44 provide a pressure system for the monolith assemblies 16 stacked within the reactor housing 10 to hold such assemblies together in a tight relationship and prevent deleterious vibration of the units. The pressure system also compensates for different expansions between the monolith assemblies and the reactor body.

Figure 5:
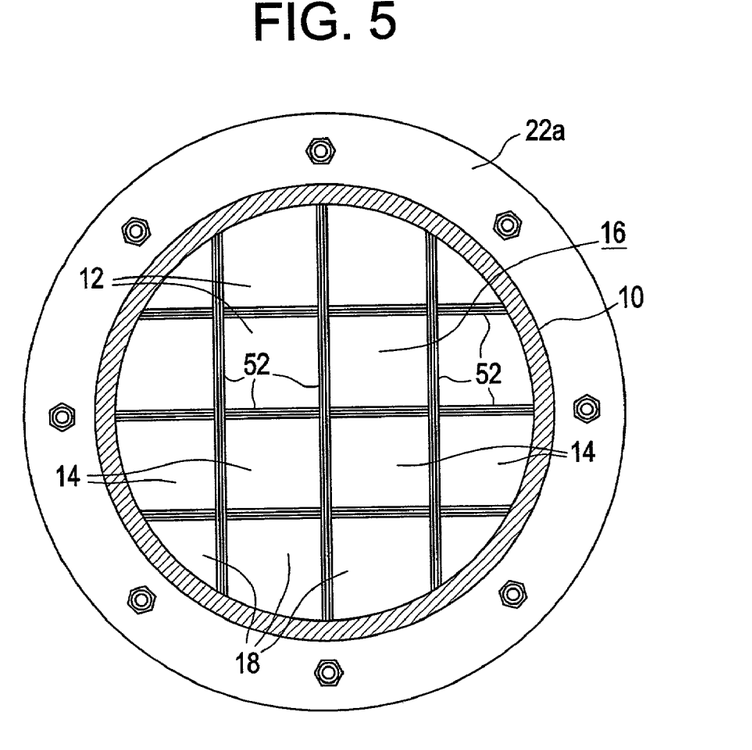
FIG. 5 is a more enlarged plan view of the ceramic substrate layout of a further embodiment of the invention showing the position of spacer members.
Figure 6:
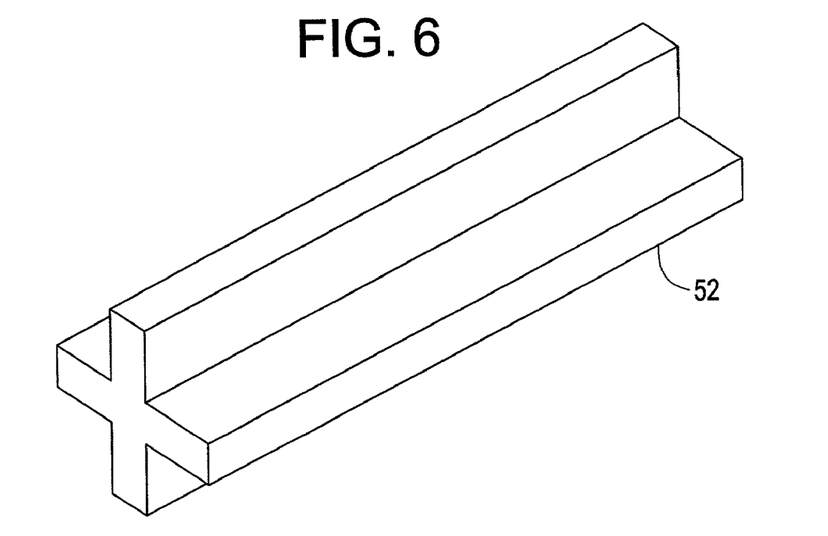
FIG. 6 is a perspective view of a spacer member utilized with the layout of FIG. 5.
Figure 7:
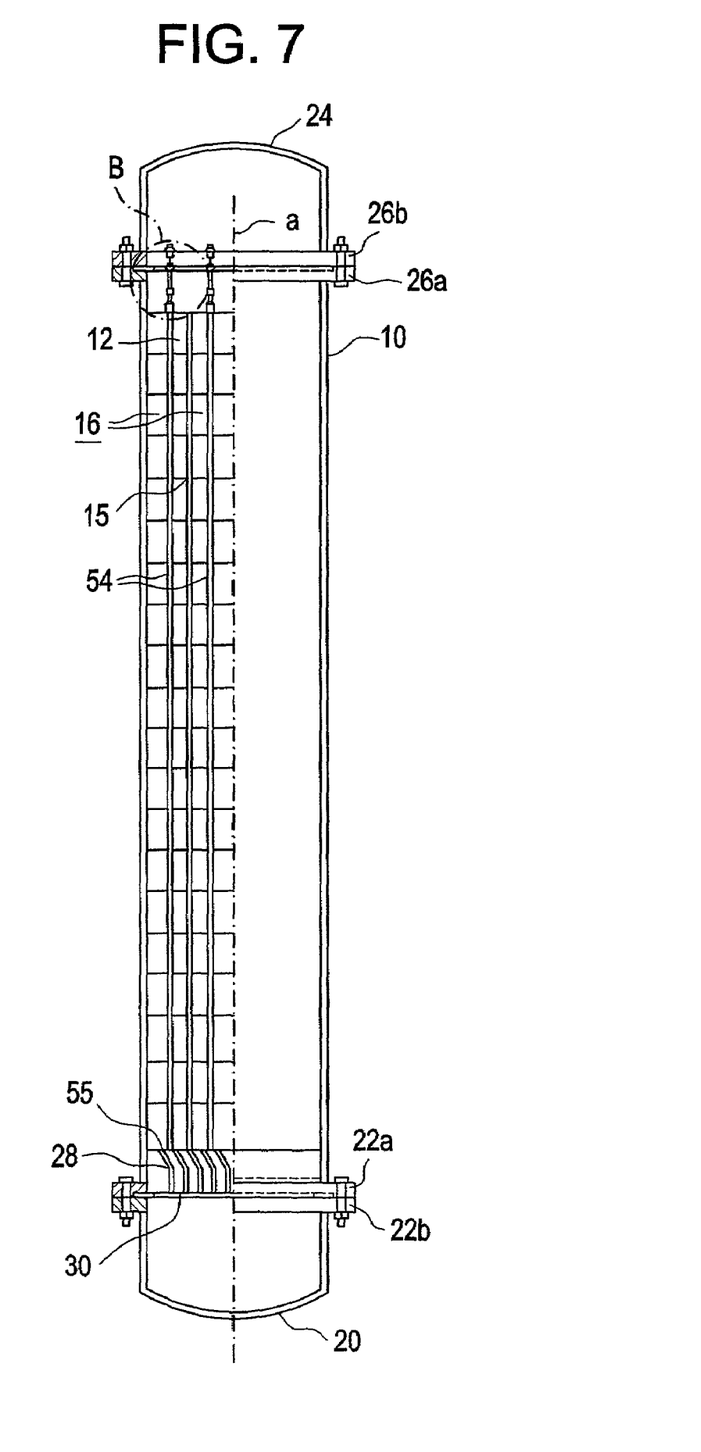
FIG. 7 is a schematic view in elevation, partially in section, of a reactor tank showing another embodiment for supporting a stack of monolith assemblies under compression within the tank.

The embodiment shown in FIGS. 5 and 6 is similar to the embodiment shown in FIGS. 1–4, except for the stacking of the substrate assemblies 16. A section of a cross spacer 52 is shown in FIG. 6. When the monolith assemblies 16 are stacked within the reactor 10, cross spacers 52 are provided between adjoining assemblies. The spacer material may be either organic or inorganic, and may include such materials as stainless steel, Teflon, graphite and gortex. The vertical sections of the cross spacers 52 embed themselves in the upper and lower monolith assemblies, as they are stacked in the reactor, and with the horizontal section of the spacers function to seal the junctures of adjacent lateral monoliths. Although shown in a bar-like configuration, the cross spacers could be provided as a one-piece grid-like unit if desired. Other than the use of the cross spacers 52, the packing, sealing and compression are the same as in the embodiment of FIGS. 1–4. The embodiments of FIGS. 1–6 are usually utilized in a vertical position as shown, however they may be utilized in a horizontal position.

Figure 8B:
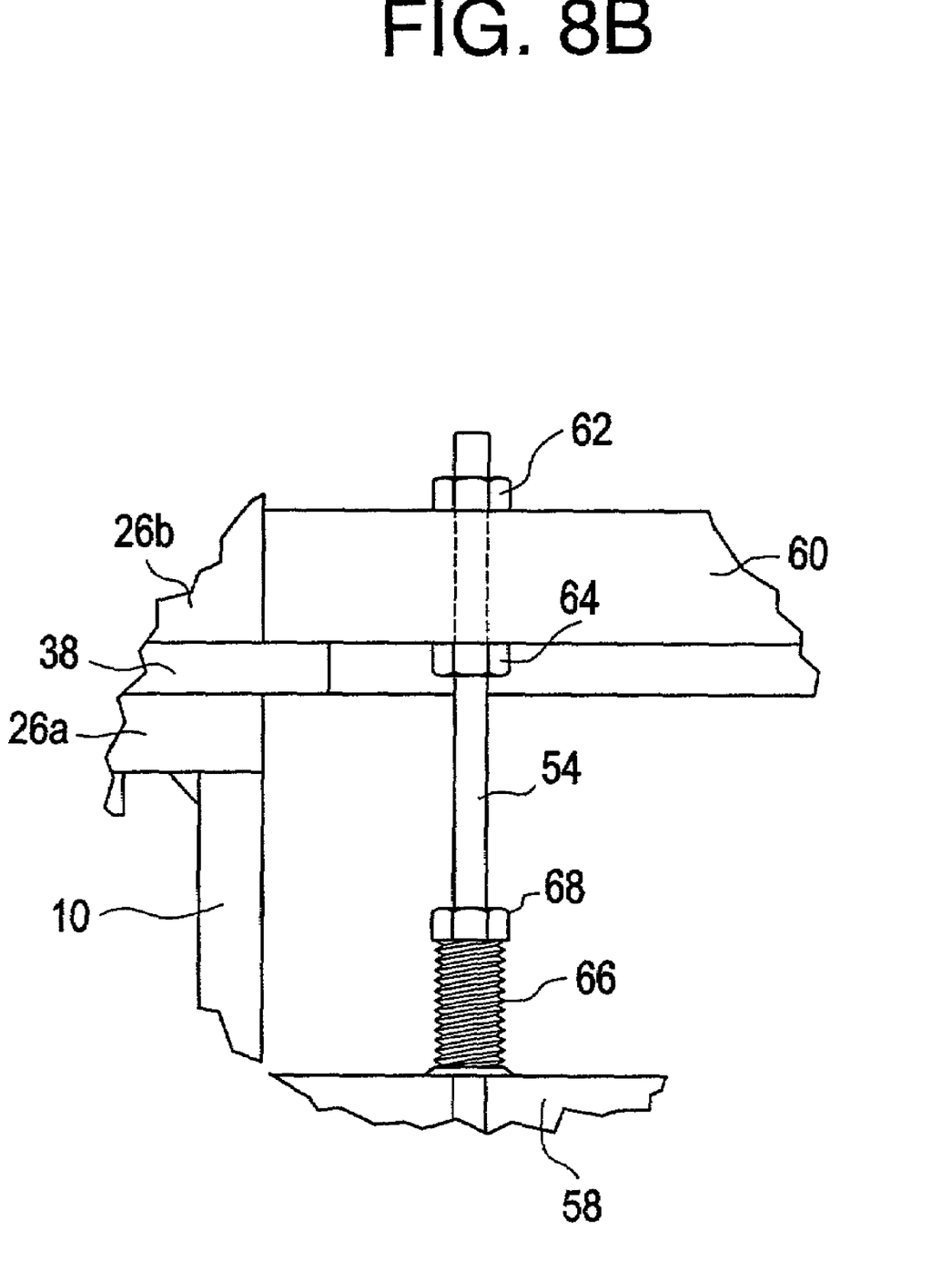
FIG. 8B is an enlarged view of the circled area "B" of FIG. 7, showing another means for providing a compressive force to the stacked monolithic assemblies.
Figure 9:
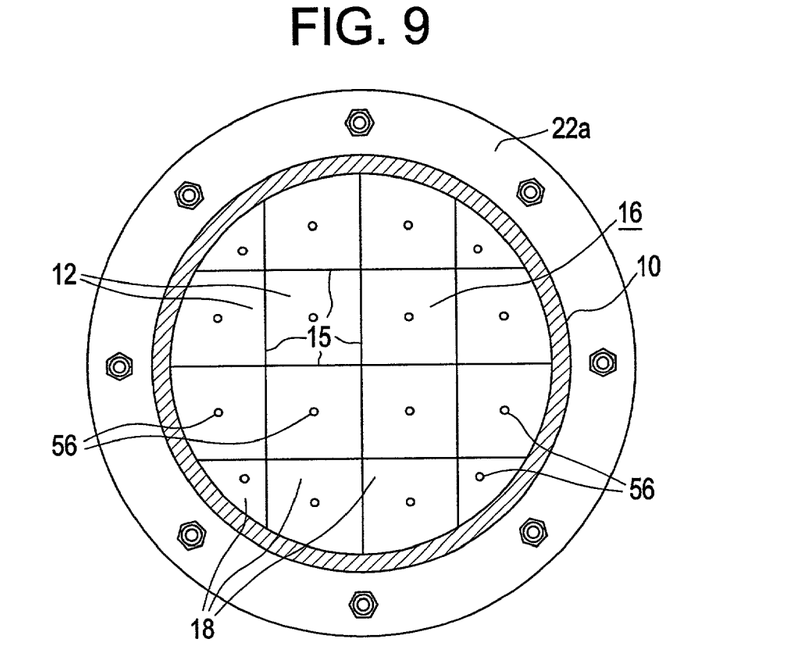
FIG. 9 is an enlarged plan view of the substrate layout within the reactor of FIG. 7.
Figure 10:
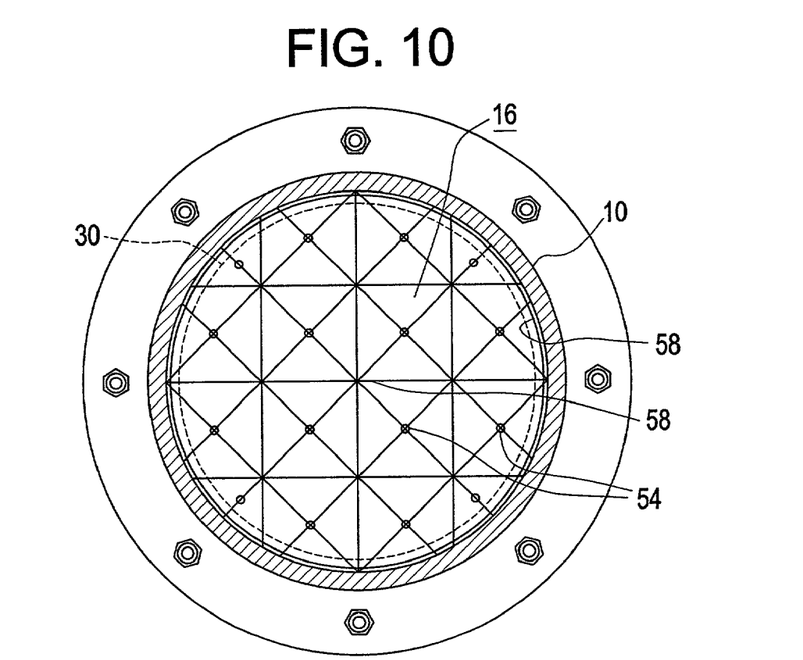
FIG. 10 is an enlarged plan view showing the support pressure grid-work layout utilized at the upper end portion of the stacked assembly of FIG. 7.

A further embodiment of the invention is shown in FIGS. 7, 8B, 9 and 10, wherein rods 54 are utilized to support the stacked assemblies 16. As shown in FIG. 9, holes 56 are formed in each of the individual monoliths 12 of the assemblies 16. The reactor housing is similar to that shown in FIG. 1, except as an option, the static mixer 28 is shown positioned within the main housing 10 on a suspension ring 30. The flow is preferably from the bottom to the top and may use counter flow or co-current flow as described before. The rods 54 go through the holes 56 in the monoliths 12 forming the assemblies 16, and the stacks are supported from the top of the reactor as shown in FIG. 8B. Each rod 54 has a washer or small plate 55 attached thereto to retain the monolith assemblies on the rods, and accordingly a lower support grating is not required. A sealing gasket and a pressure grid are positioned on top of the upper monolith assembly as before. However, the pressure grid 58 is provided with openings at the intersection of the grid members, and it is orientated so that the holes in the intersections of the grid members lie over and receive the rods 54 there through. A suspension ring 38 is retained between flanges 26a and 26b and retains a support grating 60. The upper end of the rods 54, which are threaded, extend up through the support grating 60 and are fixedly secured thereto by nuts 62, 64. Suitable compression means are positioned about the rods 54 such as a Belville spring washer, or a compression spring 66 urged against pressure grid 58 by an adjustment nut 68. Here again, the spring loading prevents vibration and pressure and temperature effects on the stacked monolith assemblies 16 by keeping them under a constant predetermined compression.

Figure 11:
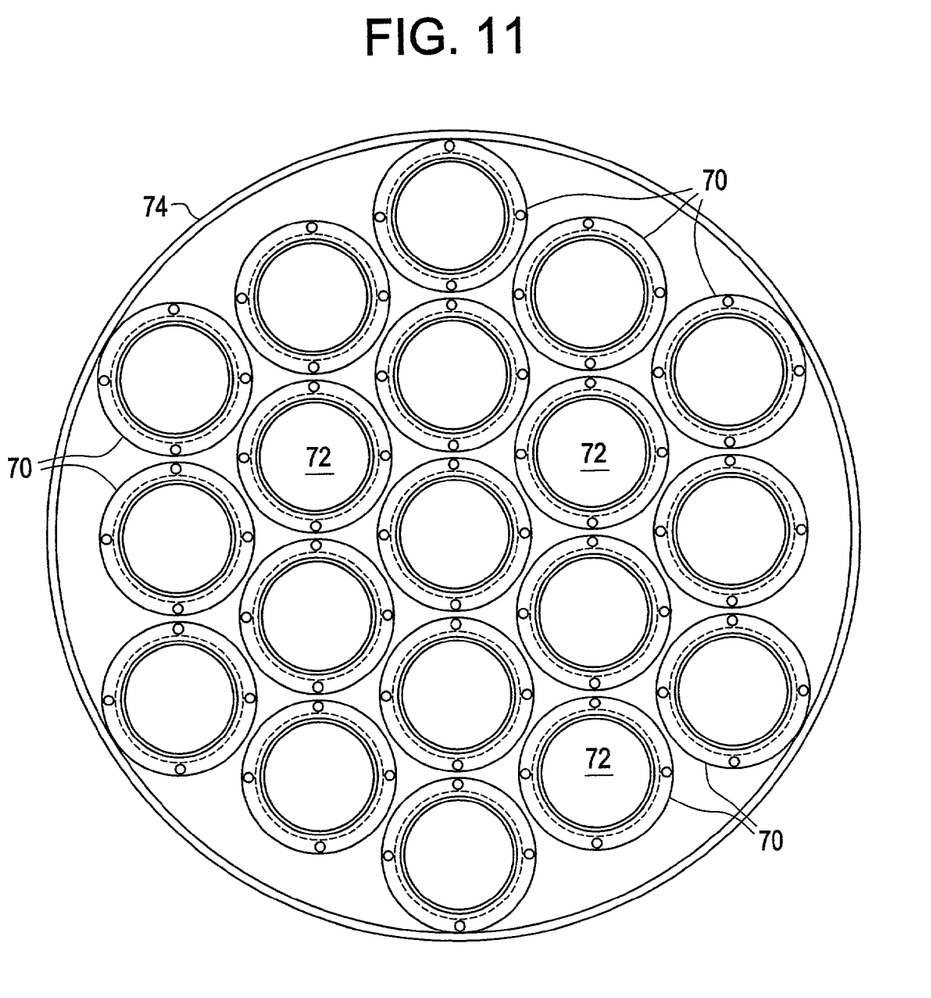
FIG. 11 is a plan view of a further embodiment showing an arrangement of a plurality of individual containers having stacked monoliths therein positioned within a reactor housing.

The embodiment shown in FIG. 11 relates to a series of individually housed monoliths packaged together to form a large diameter assembly. A plurality of smaller housings 70, each containing a stack 72 of either single monoliths or of assembled monoliths is positioned within a larger housing 74. Each individual housing 70 may be stacked in layers to fill a reactor of any length. Again, each housing 70 is spring loaded in either manner previously described to compensate for expansion and vibration. Individual packaging allows for ease of assembly and faster removal. Each reactor housing 70 may be provided with its own liquid distributor and gas delivery system. Although the system has more void volume compared to the previous embodiments, it provides a capability to build larger monolith assemblies with built-in support rods, with each rod being independently supported on a frame in the reactor.

Although we have disclosed the now preferred embodiments of our invention, additional embodiments may be perceived by those skilled in the art without departing from the spirit and scope of the invention defined in the appended claims.

We claim:

1. A reactor for use in chemical processes comprising:
   a reactor housing,
   a plurality of honeycomb substrates positioned in a stacked relationship within said reactor housing along a longitudinal axis thereof, and
   means for holding said stacked substrates tightly together for preventing deleterious vibration of the substrates and for compensating for different expansions between the stacked substrates and the reactor housing, wherein said means for holding said honeycomb substrates tightly together includes spring compression means for maintaining a virtually constant predetermined compression on said stack of substrates.

2. A reactor as defined in claim 1 wherein longitudinal end portions of adjacent ones of said plurality of honeycomb substrates are in contact with each other.

3. A reactor as defined in claim 1 wherein each of said plurality of stacked honeycomb substrates is in the form of an assembly of individual substrates cemented together about their longitudinal edges forming junctures between the honeycomb substrates.

4. A reactor as defined in claim 3 wherein each assembly of honeycomb substrates is rotated up to about 90 degrees about a longitudinal axis of the reactor housing with respect to an adjacent assembly in the stack, or the honeycomb channels of the assembly are offset from the adjacent assembly, so as to provide a zigzag flow path through the reactor.

5. A reactor as defined in claim 3 which further comprises support means including a support grating positioned at the bottom of said stack of honeycomb substrates, and having a grate pattern similar to the junctures between the honeycomb substrates.

6. A reactor as defined in claim 1 wherein spring compression means are urged against an upper portion of said stack of honeycomb substrates.

7. A reactor as defined in claim 5 wherein said spring compression means includes adjustment means for adjusting the amount of pressure applied to the honeycomb substrates within said stack between said support grating and the upper portion of said stack by said spring means.

8. A reactor as defined in claim 7 including a grate member positioned over the uppermost honeycomb substrate in said stack, said spring compression means being in contact with said grate member, and said adjustment means including threaded means adjacent said spring member for providing a predetermined pressure to said grate member and for maintaining said stack of honeycomb substrates under constant compression to prevent deleterious vibration, pressure and temperature effects on the honeycomb strcutures.

9. A reactor as defined in claim 6 wherein at least one rod means, threaded at an upper end portion, extends through said stack of honeycomb substrates and secures at it upper end within said housing, said support grating being secured to the bottom of said rod means and supporting the bottom honeycomb substrate in said stack, a pressure grid positioned over the uppermost monolith in said stack, said spring means overlying said threaded rod portion, and adjustment means on said rod means for maintaining said stack of honeycomb substrates under a constant predetermined compression to prevent deleterious vibration and compensate for different expansions between the stacked honeycomb substrates and reactor housing.

10. A reactor as defined in claim 3 wherein cross-like spacers are provided between adjoining honeycomb substrate assemblies in said stack, and a portion of said spacers being embedded within said adjoining assemblies.

* * * * *